United States Patent [19]

Krüper

[11] 4,005,646
[45] Feb. 1, 1977

[54] ROTATABLE GRILL

[75] Inventor: Burkhard Krüper, Menden, Germany

[73] Assignee: Firma Gebr. Cramer, Menden, Germany

[22] Filed: Sept. 2, 1975

[21] Appl. No.: 609,465

[30] Foreign Application Priority Data

Oct. 4, 1974 Germany .................. 7433343[U]

[52] U.S. Cl. .................. 99/427; 99/443 R; 99/450

[51] Int. Cl.² .................. A47J 37/04

[58] Field of Search ........... 99/427, 323.5, 323.9, 99/339, 340–349, 379–380, 402, 426, 443, 450; 220/19

[56] References Cited

UNITED STATES PATENTS

| 504,256 | 8/1893 | Strong | 99/427 X |
|---|---|---|---|
| 534,255 | 2/1895 | Fleming | 99/340 |
| 553,363 | 1/1896 | Sickels | 99/427 |
| 1,162,859 | 12/1915 | Guillot | 220/19 X |
| 2,882,812 | 4/1959 | Greenwald | 99/427 |
| 2,938,450 | 5/1960 | Carpenter et al. | 99/427 |
| 3,084,618 | 4/1963 | Dieterich | 99/427 |
| 3,163,103 | 12/1964 | Shoup | 99/427 |
| 3,181,453 | 5/1965 | Moran | 99/349 |
| 3,372,636 | 3/1968 | Marasco | 99/427 |
| 3,992,961 | 12/1975 | Case | 99/450 X |

FOREIGN PATENTS OR APPLICATIONS 921,957  3/1963  United Kingdom ............ 99/427

Primary Examiner—Stanley M. Gilreath
Assistant Examiner—Arthur O. Henderson

[57] ABSTRACT

A rotatable grill for demountably retaining food objects consisting of a first basket half and a second basket half which is similar in size to the first basket half and a pivotable bracket means for adjustably joining the ends of the bracket halves to form a closed basket at their longitudinal sides. The baskets are pivotably movable with respect to each other in the opened position. The basket halves include interengaging braces which are clamped at their ends and allow the basket halves to be pivoted with respect to each other to an open position at least 90° from the closed position. The bearing shafts which hold the baskets together include threaded ends and nuts for securing the ends of the braces. The baskets also have extending wire ends which are bent at an acute angle so that when the baskets are almost closed, the extending ends mesh in a tooth-like manner.

9 Claims, 4 Drawing Figures

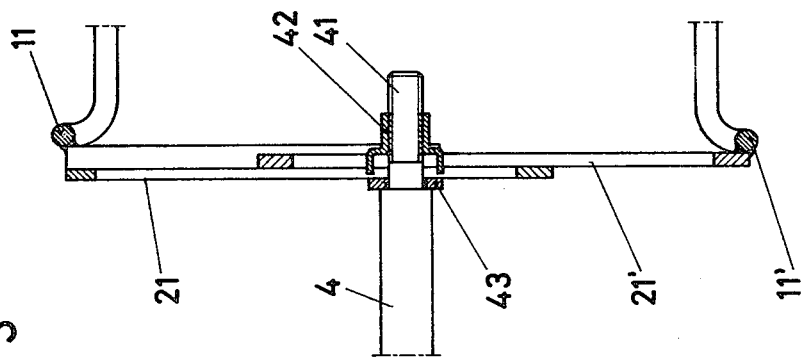
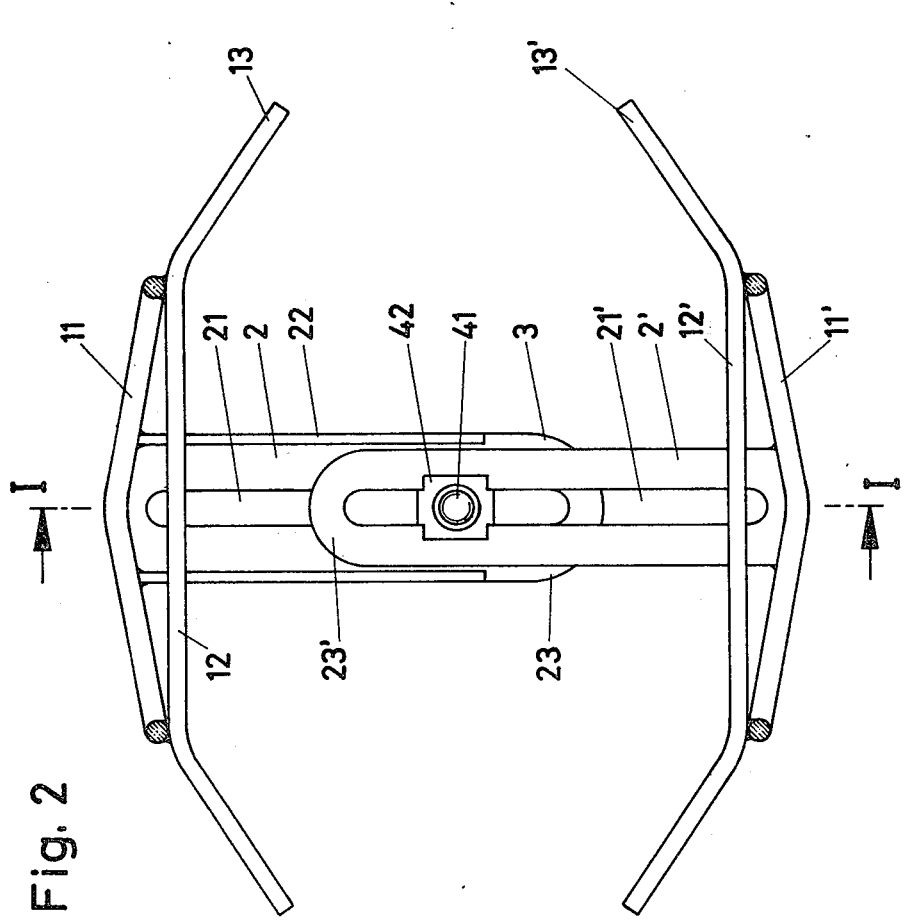

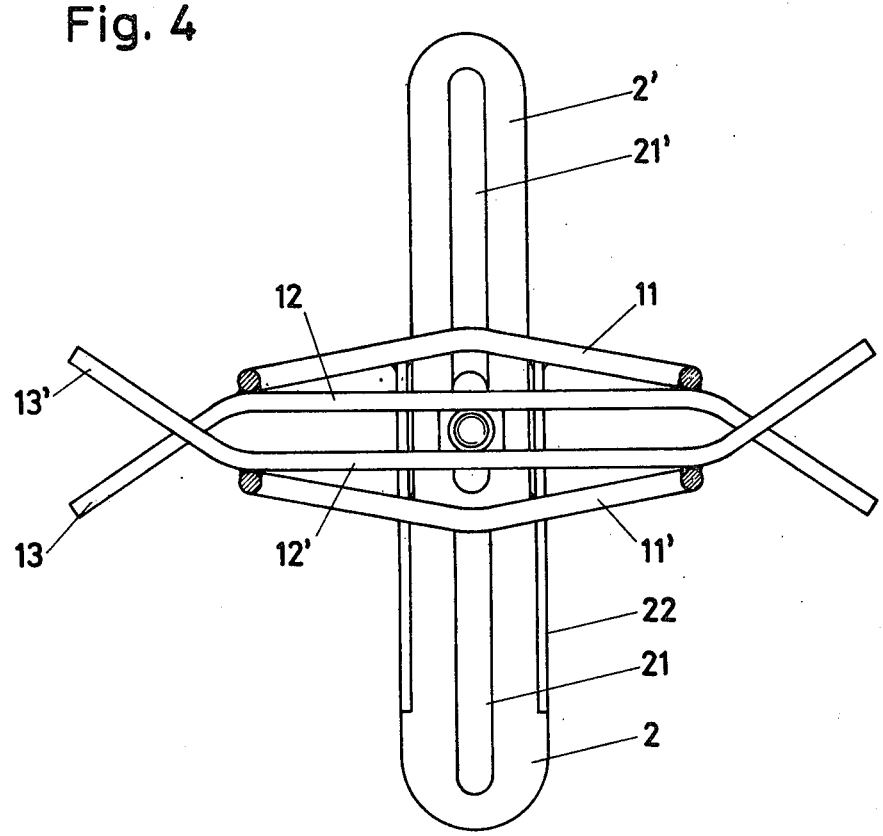

ROTATABLE GRILL

This invention relates to a rotatable grill basket having two separate baskets which are moveable toward each other and receive foods of different size. Such grill devices are used for grilling food objects equally from all sides and are spaced apart from each other. The baskets are operated either manually, or driven with associated electrical motors. The baskets are also mounted on suitable bearings.

These types of grilling devices are advantageous because the foods to be grilled do not have to be pierced and mounted on grilling spears. Moreover, if a larger food object is put on such a grilling spear, the spear rotates in a jerky motion so that an uneven browning and cooking takes place.

A grilling basket is known which consists of two flat wire frames which are moveable toward each other. In this construction, a sliding sleeve is provided with an adjusting screw at the front surface of one of the frames, while on the other frame, guide rods are provided on the front surface which can be rigidly positioned at a given point.

Bearings are provided on the guide rods for the shaft ends with which the basket can be rotatably positioned on the grilling device. These flat frames or baskets are disadvantageous because the grilled foods may slide out laterally. While the grilled foods are cooked, a shrinking occurs, so that with a fixed lateral slot, the food slides out.

It is already known to provide a convex basket whereby the two baskets are moveable with respect to each other. However, the two baskets cannot be moved closely toward each other, so that the grilled foods are sufficiently maintained therein. In other words, the grilled foods may slide back and forth within the basket. Furthermore, because of the shrinking effect during cooking, the grilled foods may slide out of the baskets.

It is therefore an object of the invention to provide an improved grill basket of the aforementioned type and to improve the insertion of the foods to be grilled.

In the improved grilling basket of the invention, the two basket halves, when in closed condition, form a closed basket at their longitudinal sides, so that the two basket halves in their opening position are pivotably moveable with respect to each other.

Apart from the pivotability of the two basket halves, the grilled foods are prevented from sliding out during the rotation of the grill basket. Each half of the basket is formed by a frame or a frame profile, whereby in the lateral direction, oppositely arranged wires or rods are provided. The oppositely bent or distorted extending wires are offset with respect to the other basket half. The foods to be grilled will thus be completely enclosed at its longitudinal ends. For very flat grilled foods, the wire ends engage in a teeth-like fashion.

In a preferred embodiment of the invention, the two basket halves are connected to each other by two clips which are both moveable and braceable with respect to each other. At least the guiding brace has a U-shaped profile in one of its portions. However, at the two opposing ends which face each other, the braces are flat, so that one brace is pivotable with respect to the other brace by about 90°. The bearing shafts are extended through the two braces by means of threaded ends which extend through guide slots, and have disks provided at the outside. At the inner side of the braces, a nut is provided with engages the guide slots, and the nut is adjustable by moving the bearing shafts.

Because the grill basket can be unfolded, the insertion of the foods is simplified. In such a grill basket, large meat roasts may be inserted, as well as flat grill foods such as fish or bread.

Other objects and features of the present invention will become apparent from the following detailed description when taken in connection with the accompanying drawings which disclose several embodiments of the invention. It is to be understood however that the drawings are designed for the purposes of illustration only, and are not intended as a definition of the limits and scope of the invention disclosed.

In the drawings, wherein similar reference numerals denote similar elements throughout the several views:

FIG. 2 is a cross-sectional view taken through the grill basket while the basket halves are in an extended position;

FIG. 3 is a corresponding cross-sectional view showing the two basket halves in a closed condition; and FIG. 4 is a cross sectional view taken along line I—I of FIG. 2.

Figure 1:
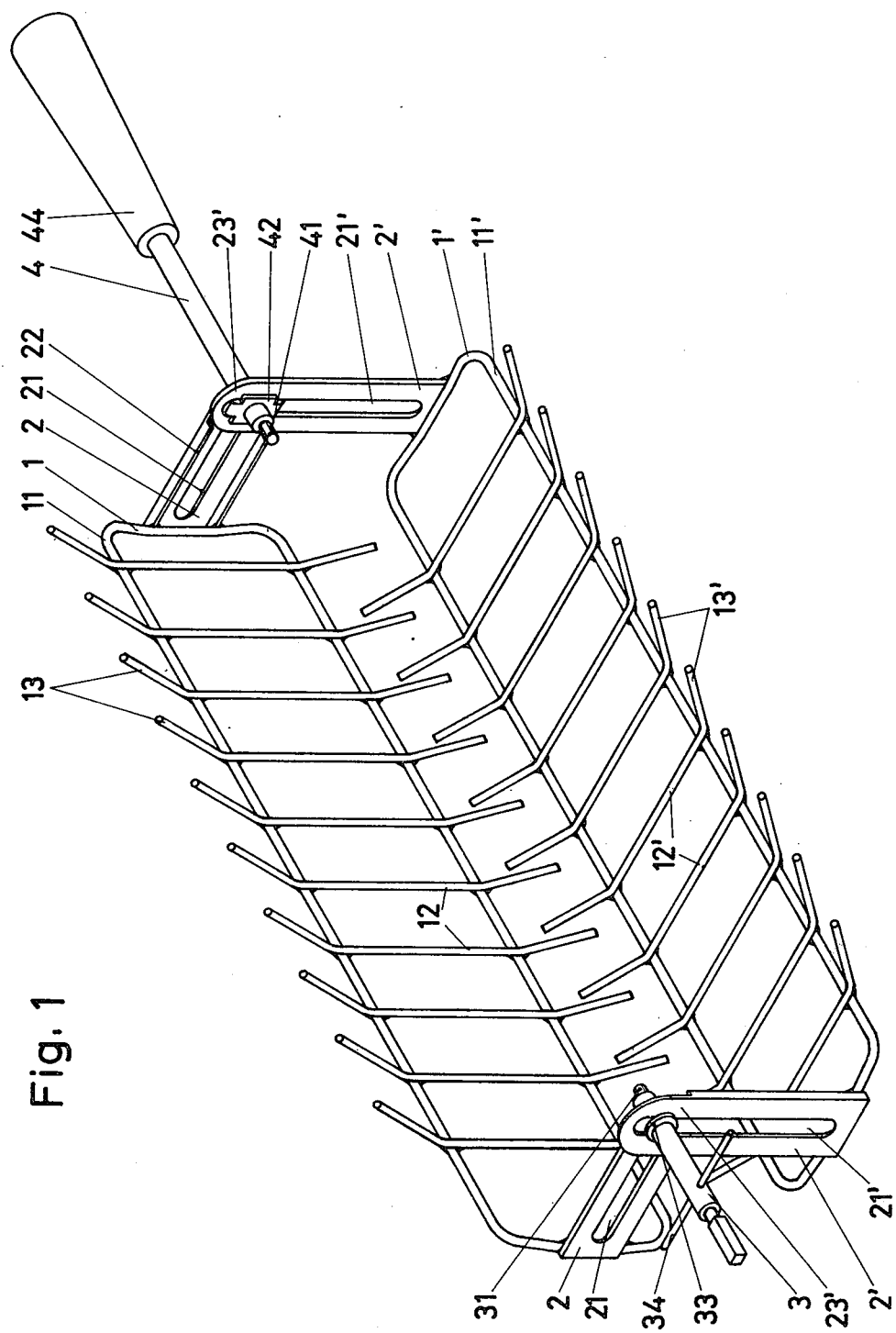
FIG. 1 is a perspective view of the grill basket of the invention in its unfolded position.

Referring to FIGS. 1–4, there is shown a rotatable grilling basket consisting essentially of two wire halves, 1 and 1' which are moveable with respect to each other by means of braces 2 and 2' located at the front surface of the two halves of the basket. Such a basket half consists of a substantially rectangular frame 11 or 11', respectively, which are connected to each other in a lateral direction by means of wires or rods 12 or 12', respectively which laterally extend the frame with their ends 13 or 13', respectively.

Instead of a frame, any other carrying structure may be chosen. The wires of one basket half are offset with respect to the other half of the basket, so that the bent ends of wires 13 or 13', respectively are engaging each other when the two basket halves 1 or 1' are moved toward each other.

The displacement with respect toward each other is carried out by means of the front surface braces 2 and 2'. Brace 2 may be flat while at the other brace 2', lateral ribs 22' are provided for guiding in a partial region thereof. In this region, the brace has a U-shaped cross section. In each brace, a guide slot 21 or 21' is provided. The threaded ends 31 or 41 respectively of the two bearing shafts 3 or 4, respectively, extend through these two slots. Disks 33 or 43, respectively, may be mounted onto each shaft end. As the inner side, a nut 31 or 41, respectively is mounted which engages the guide elements with associated elements. By moving bearing shaft 3 at a toggle 34, or bearing shaft 4 at handle 44, to adjust the clamping screw, the two braces 2 or 2' are displaceable with respect toward each other.

In order to pivotably move one of the basket halves with respect to the other basket half, it is necessary that braces 2 or 2' are flat at their opposing ends 23 or 23'.

As can be seen from FIG. 1, basket half 1 may be pivotably moved by about 90° with respect to basket half 1'. In this case, braces 2 are engaged with section 23 on top of guiding shanks 22' of brace 2'.

In order to sufficiently maintain very flat grilled goods, it is essential to evenly form the two basket halves in the range of the frame, that is, with respect to the laterally extending wires. In a suitable formation of the clamping device at the braces, the two basket halves may be flatly moved toward each other, so that the extending wire ends engage with respect to each other.

While only a few embodiments of the present invention have been shown and described, it will be obvious to those skilled in the art that many changes and modifications may be made thereunto without departing from the spirit and scope of the invention.

What is claimed is:

1. A rotatable grill for demountably retaining food objects comprising:
   a first basket half;
   a second basket half similar in size to said first basket half; and
   pivotable bracket means for adjustably joining the ends of said basket halves to form a closed basket at their longitudinal sides, said baskets being pivotably moveable with respect to each other in the opened position.

2. The grill according to claim 1, wherein said bracket means comprises interengaging braces each having one end secured to a basket half, and a free end which is clampable at each moveable position of said basket.

3. The grill according to claim 2 wherein each brace comprises a guide slot, bearing shafts disposed through said guide slots of each interengaging brace, and a clamping screw formed on the end of each bearing shaft for demountably securing the interengaging braces together.

4. The grill according to claim 3 wherein at least one of said interengaging braces has a U-shaped cross section along a portion thereof.

5. The grill according to claim 4 wherein the free ends of the interengaging braces are flat so that one brace is pivotably moveable with respect to the other brace by at least 90°.

6. The grill according to claim 3 wherein said bearing shafts have threaded ends which extend through the slots of said braces, a disk is disposed on the side of each brace external to said basket halves and mounted on each threaded end, and a nut threadably engaged to each threaded end of said bearing shafts internal to said basket halves, said nut being adjustable by rotating said bearing shafts.

7. A grill comprising two oppositely arranged and displaceable wire basket halves for receiving differently shaped foods for grilling, each basket half consisting of a frame profile having laterally extending wires with free ends that are oppositely bent at an acute angle, said wire ends extending beyond said frame profile the extending wire ends of one basket half being offset with respect to the other basket half.

8. The grill according to claim 7 wherein both basket halves are evenly shaped within their frame area and laterally extending wires.

9. A grill according to claim 7 including pivotable bracket means for adjustably joining said wire basket halves to form a closed basket at their longitudinal sides.

* * * * *